(12) United States Patent
Miralles et al.

(10) Patent No.: US 8,513,179 B2
(45) Date of Patent: Aug. 20, 2013

(54) DETERGENT RESISTANT CAR POLISH

(75) Inventors: Altony J. Miralles, Woodbury, MN (US); Jerry D. Hoyt, Hastings, MN (US); Robert J. Ryther, St. Paul, MN (US)

(73) Assignee: Zep IP Holding LLC, Atlanta, GA (US)

( * ) Notice: Subject to any disclaimer, the term of this patent is extended or adjusted under 35 U.S.C. 154(b) by 124 days.

(21) Appl. No.: 12/966,569

(22) Filed: Dec. 13, 2010

(65) Prior Publication Data

US 2011/0082231 A1    Apr. 7, 2011

Related U.S. Application Data

(62) Division of application No. 11/287,796, filed on Nov. 28, 2005, now Pat. No. 7,875,584.

(51) Int. Cl.
*C08K 5/09* (2006.01)

(52) U.S. Cl.
USPC ............ 510/466; 510/245; 510/254; 524/284

(58) Field of Classification Search
USPC ........................ 510/254, 245, 466; 524/284
See application file for complete search history.

(56) References Cited

U.S. PATENT DOCUMENTS

| | | | |
|---|---|---|---|
| 4,273,584 A * | 6/1981 | D'Angelo et al. ................ 106/3 |
| 4,948,531 A * | 8/1990 | Fuggini et al. ................ 510/400 |
| 5,154,759 A * | 10/1992 | Cifuentes et al. ................ 106/3 |
| 5,258,063 A | 11/1993 | Cifuentes et al. |
| 5,264,027 A | 11/1993 | Martin et al. |
| 5,330,787 A | 7/1994 | Berlin et al. |
| 5,518,533 A | 5/1996 | Howe |
| 5,531,814 A | 7/1996 | Bahr et al. |
| 5,782,962 A | 7/1998 | Burke et al. |
| 5,871,590 A | 2/1999 | Hei et al. |
| 5,913,969 A | 6/1999 | Howe |
| 5,968,238 A | 10/1999 | Healy et al. |
| 6,462,009 B1 | 10/2002 | Nagy et al. |
| 6,506,715 B1 * | 1/2003 | Schultz et al. ................ 510/189 |
| 6,685,765 B1 | 2/2004 | Ghodoussi |
| 6,699,825 B2 | 3/2004 | Rees et al. |
| 6,855,680 B2 * | 2/2005 | Smerznak et al. ............ 510/321 |
| 7,753,998 B2 * | 7/2010 | Schultz et al. ..................... 106/3 |
| 2003/0129420 A1 * | 7/2003 | Schultz et al. ................ 428/447 |
| 2005/0155515 A1 * | 7/2005 | Jordan et al. .................... 106/10 |
| 2005/0187121 A1 * | 8/2005 | Dietz ............................ 510/242 |

* cited by examiner

*Primary Examiner* — Liam Heincer
*Assistant Examiner* — M. Reza Asdjodi
(74) *Attorney, Agent, or Firm* — Hunton & Williams LLP

(57) ABSTRACT

A detergent resistant car polish composition includes an alkoxy aminofunctional dialkylpolysiloxane, a long chain silicone quaternary blend, a silicone fatty amino quaternary polydimethylsiloxane, a carboxylic acid, a surfactant, a cosurfactant, and water.

12 Claims, No Drawings

DETERGENT RESISTANT CAR POLISH

CROSS REFERENCE TO RELATED APPLICATIONS

This application is a divisional application of U.S. patent application Ser. No. 11/287,796, filed Nov. 28, 2005, published as 2007-0123443, now allowed. The entire disclosure of which is incorporated herein by reference in its entirety.

BACKGROUND OF THE INVENTION

The present invention relates to a composition for protecting a surface. In particular, the present invention relates to a composition for forming a water resistant and high gloss coat on a surface.

Soiled vehicle surfaces have been cleaned for many years using a variety of compositions and methods. Such compositions can be as simple as soap solutions or organic dish soaps or common all-purpose utility cleaners. In commercial or industrial vehicle cleaning operations, such as semi-automatic and completely automatic vehicle washes, a variety of cleaning systems have been used that often contain a pre-rinse or pre-cleaning step followed by a cleaning step using a low pH and/or high pH detergents and a combination of one or more steps using waxes, rinses, anti-rust agents, mechanical dryers, etc. Such vehicle cleaning operations can be embodied in a retail cleaning operation designed for cleaning vehicles by personal owners or by vehicle wash personnel.

When running a vehicle through a commercial vehicle cleaning wash, it is desirable to apply a wax after the vehicle has been washed in order to coat the vehicle with a protective film. The protective film is water resistant. The wax is typically applied to the vehicle by spraying the aqueous solution onto the vehicle at the end of the wash operation, rinsing the vehicle with water, and air blowing the excess water from the vehicle. The result is a hydrophobic surface that is formed on the surface of the vehicle.

A class of waxing composition commonly available includes a formulation comprising surfactants, solvents, and a wax to form a shiny hydrophobic surface. Silicones are very hydrophobic materials with a high refractive index that, when used in vehicle waxing compositions with other components such as nonionic detergents, will form a shiny surface over the vehicle. After a wash, the surface of the vehicle is left with a residual negative charge. This residual charge creates an electrostatic attraction to molecules with a tendency to accept electrons. Therefore, molecules containing quaternary amines will be attracted to the surface. If reactive protonated amino siloxanes are used in the formulation, they will be electrostatically attracted to the surface and will eventually polymerize, creating a hydrophobic film that rejects water and helps to retain gloss enhancing agents.

BRIEF SUMMARY OF THE INVENTION

A composition of the present invention includes an alkoxy aminofunctional dialkylpolysiloxane, a long chain silicone quaternary blend, a silicone fatty amino quaternary polydimethylsiloxane, a carboxylic acid, a surfactant, a cosurfactant, and water.

In one embodiment, the composition of the present invention constitutes about 0.002% to about 20% by weight alkoxy aminofunctional dialkylpolysiloxane, about 0.002% to about 50% by weight long chain silicone quaternary blend, about 0.002% to about 20% by weight silicone fatty amino quaternary polydimethylsiloxane, about 0.01% to about 5% by weight carboxylic acid, about 0.001% to about 20% by weight surfactant, about 0.001% to about 20% by weight cosurfactant, and water.

A method of coating and protecting a vehicle surface includes rinsing the surface, washing the surface with a cleaning solution, applying a protective coating onto the surface, spraying the surface with water, and air-drying the vehicle. The protective coating includes an alkoxy aminofunctional dialkylpolysiloxane, a long chain silicone quaternary blend, a silicone fatty amino quaternary polydimethylsiloxane, a carboxylic acid, a surfactant, a cosurfactant, and water.

DETAILED DESCRIPTION

The composition of the present invention may be employed in any of a wide variety of situations wherein a hydrophobic film-forming coat is desired. The composition is especially useful in applications where it is desired to have the resulting film protect a surface from water and normal wear. In addition, by incorporating a long chain silicone quaternary blend into the composition, the resulting film provides a shiny and aesthetically pleasing surface. Such applications include, but are not limited to: vehicle care, easy to apply long-lasting high gloss polishes, and water rejection and protection of hard surfaces.

The present invention is a stable concentrated aqueous solution that leaves a polymeric film of an alkoxy aminofunctional dialkylpolysiloxane mix with a quaternary long chain silicone blend on a surface after rinsing with water. The resulting film creates a protective hydrophobic, high gloss barrier resistant to common vehicle wash chemicals. The composition can be applied at the end of the vehicle wash operation by spraying onto the surface of the vehicle, rinsing out with water, and air blowing dry. Unlike most film-forming compositions currently known in the art, the vehicle surface does not have to be dry for the film to be effective. Although the composition is discussed as being applied to the surface of a vehicle, the composition may be used on any surface where a hydrophobic, high gloss protective film is desired.

The composition of the present invention includes an alkoxy aminofunctional dialkylpolysiloxane, a long chain silicone quaternary blend, a silicone fatty amino quaternary blend, a surfactant, a cosurfactant, and water. All concentrations herein are expressed in weight percent, unless otherwise stated. Suitable component concentrations in the composition of the present invention range from about 0.002% to about 20% alkoxy aminofunctional dialkylpolysiloxane, about 0.002% to about 50% long chain silicone quaternary blend, about 0.002% to about 20% by weight silicone fatty amino quaternary polydimethylsiloxane, about 0.01% to about 5% by weight carboxylic acid, about 0.001% to about 20% surfactant, and about 0.001% to about 20% by weight cosurfactant. Particularly suitable component concentrations in the composition of the present invention range from about 1% to about 3% alkoxy aminofunctional dialkylpolysiloxane, about 1% to about 3% long chain silicone quaternary blend, about 1% to about 3% silicone fatty amino quaternary blend, about 1% to 3% carboxylic acid, about 5% to about 17% surfactant, and about 5% to about 17% cosurfactant. Those skilled in the art will appreciate other suitable component concentration ranges for obtaining comparable physical properties of the manufactured films.

The composition of the present invention comprises a water mix of an alkoxy aminofunctional dialkylpolysiloxane chosen from high to low molecular weight (or mixes) in a range from approximately 0.002% to approximately 20%. The alkoxy aminofunctional dialkylpolysiloxane includes, but is not limited to:

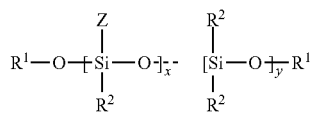

Where $R^1$ is an alkyl group, such as, but not limited to, methyl; $R^2$ is a monovalent hydrocarbon group having from 1 to 20 carbon atoms or a halogen-substituted group thereof, and at least 50% of the $R^2$ groups are methyl groups; and Z is an amino-substituted monovalent hydrocarbon group represented by the formula:

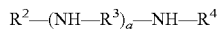

Where $R^3$ is a divalent hydrocarbon group having from 1 to 5 carbon atoms; $R^4$ is a hydrogen atom, a monovalent hydrocarbon group having from 1 to 20 carbon atoms or a halogen-substituted group thereof; a is a number of 0, 1, 2 or 3; and x and y are each a positive integer, x+y being sufficiently large to give a viscosity from 5 to 100,000 centistokes at 25° C.

Protonation of the aminofunctional groups ensures that the alkoxy aminofunctional dialkylpolysiloxane strongly adheres to the surface where the composition is deposited onto, such as vehicle finishes, glass, plastics, chrome, and other metal surfaces. The alkoxy groups of the alkoxy aminofunctional dialkylpolysiloxane react with water and generate terminal silanol groups (Si—OH) that when deposited onto a hard surface, will react with other silanol groups from a similar molecule, creating a Si—O—Si bond, causing polymerization, and creating a highly hygroscopic water-resistant polymeric polish film.

Examples of suitable commercially available alkoxy aminofunctional dialkylpolysiloxanes for the present invention include: SF-1706 and SF-1922, available from GE Silicones, Waterford, N.Y.; Dow Corning 531 Fluid and Dow Corning 536 Fluid, available from Dow Corning Corporation, Midland, Mich.; and Tego Polish Additiv ACS, Tego Polish Additiv C 3919, Tego Polish Additiv E 340/5, and Tego Polish Additiv AE 30, available from Goldschmidt Chemical Corporation, Hopewell, Va..

Long chain silicone quaternary blends are used as beading and gloss enhancing agents and help protect the surface covered by the polymer once the polymer has developed on the surface. Examples of suitable long chain silicone quaternary blends for the present invention are quaternary and diquaternary polydimethylsiloxanes. The long chain silicone quaternary blend component includes, but is not limited to:

a) from 0.002 wt % to 50 wt % of a quaternary polydimethylsiloxane having the formula:

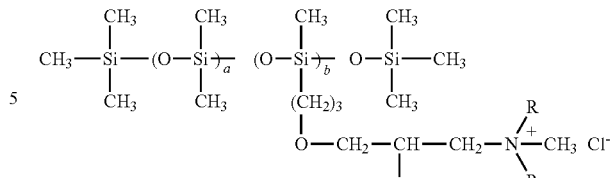

Where R is an alkyl group that can range from $C_1$-$C_8$, and a=6 to 10,000, and b=1 to 5.

b) from 0.002 wt % to 50 wt % of a diquaternary polydimethylsiloxane having the formula:

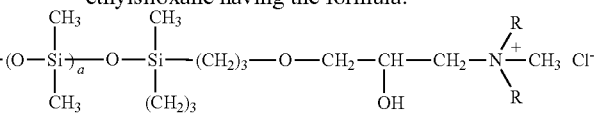

Where R is an alkyl group that can range from $C_1$-$C_8$, and a=6 to 10,000.

c) from 0.002 wt % to 20 wt % of a silicone fatty amino quaternary polydimethylsiloxane having the formula:

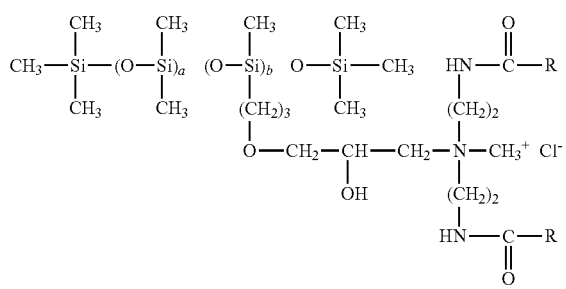

Where R is an alkyl group that can range from $C_1$-$C_8$, and a=6 to 10,000, and b=1 to 5.

Examples of suitable long chain silicone quaternary blend are quaternary polydimethylsiloxanes, diquaternary polydimethylsiloxanes, and quaternary ammonium compounds such as dicocoalkyl and dimethyl chlorides. Examples of suitable commercially available long chain silicone quaternary blends include: Tego Polish Additiv Q70, Tegopren 6920, Tegopren 6924, available from Goldchmidt Chemical Corporation, Hopewell, Va.; Silquat J-15, Silquat Di-12, Silquat 3180, Silquat D208-CA, Silquat D208-TA, and Silquat D-208-TDA, available from Siltech, Toronto, Canada. An example of a particularly suitable commercially available long chain silicone quaternary blend is Tegopren 6922, available from Goldschmidt Chemical Corporation.

Surfactants help to maintain the various chemical components of the composition in solution. Suitable surfactants of the composition of the present invention are nonionic surfactants, cationic surfactants, and zwitterionic or amphoteric surfactants.

Nonionic surfactants are used as solubilizer and wetting agents. Examples of suitable commercially available nonionic surfactants include: Ammonyx CDO, Ammonyx LO, and Ammonyx MCO, available from Stepan Company, Northfield, Ill.; Barlox C, Barlox 12, and Barlox 14, available from Lonza Group, Limited, Allendale, N.J.; Incromine Oxide M, available from Croda, Inc., Edison N.J.; Rhodamox LO and Rhodasurf BC-720, available from Rhodia, Cranbury, N.J.; Tomah AO-14-2, available from Tomah[3] Products, Incorporated, Milton, Wis.; Glucopon 625, available from Cognis North America Corporation, Cincinnati, Ohio; and Triton X-100, available from Dow Chemical Company, Midland, Mich..

Cationic surfactants (or mixes of them) act as solubilizers and are driving agents for the silicone quaternary blends and the alkoxy aminofunctional siloxanes. Examples of suitable commercially available cationic surfactants of the composition of the present invention include: Carspray 400, Carspray 401, and Variquat K300 available from Goldschmidt Chemical Corporation, Hopewell, Va.; Tomah Q, Tomah Q-D-T, and Emulsifier 4, available from Tomah$^3$ Products, Incorporated, Milton, Wis.; Ethoquad, available from Akzo Nobel, Incorporated, Chicago, Ill.; and Rhodaquat CEDAB, available from Rhodia, Cranberry, N.J.. An example of a particularly suitable commercially available cationic surfactant is Carspray 300, available from Goldschmidt Chemical Corporation.

Examples of suitable commercially available zwitterionic or amphoteric surfactants of the composition of the present invention include: Abil B9950, Tego Betain C, Tego Betain E, Tego Betain F, Tego Betain FSO, and Tego Betain HS, available from Goldschmidt Chemical Corporation, Hopewell, Va.; Albegal A and Albegal B, available from Ciba Specialtiy Chemicals Corporation, Greenboro, N.C.; Alkali Surfactant, available from Tomah$^3$ Products, Incorporated, Milton, Wis.; Alkaterge T, available from Dow Chemical Company, Midland, Mich.; Amphosol CA and Amphosol CG, available from Stepan Company, Northfield, Ill.; Amphoterge K, Amphoterge K-2, Amphoterge KJ-2, Amphoterge SB, Amphoterge W, and Amphoterge W-2, available from Lonza Group, Limited, Fairlawn, N.J.; and Miranol BM, Miranol CM, Miranol C2M, and Miranol DM, available from Rhodia, Cranberry, N.J. An example of a particularly suitable commercially available zwitterionic surfactant is Miranol C2M-SF, available from Rhodia.

Examples of suitable commercially available cosurfactants of the composition of the present invention include: Propylene Glycol Methyl Ether, Dipropylene Glycol Methyl Ether, Tripropylene Glycol Methyl Ether, Propylene Glycol n-propyl Ether, Propylene Glycol n-butyl Ether, Diethylene Glycol-ethyl Ether, Diethylene Glycol Methyl Ether, Ethylene Glycol Propyl Ether, and Triethylene Glycol Methyl Ether available from Dow Chemical Company, Midland, Mich.; Ethylan HB4, available from Akzo Nobel Chemicals, Chicago, Ill.; Basophor HE-50, available from BASF Corporation, Florham Park, N.J.; and Polypropylene Glycol P-1200, available from Ashland Distribution Company, Columbus, Ohio. An example of a particularly suitable commercially available cosurfactant is ethylene glycol n-butyl ether, available from Dow Chemical Company.

The composition of the present invention may also include additional chemicals in varying concentrations as individual needs may require. For example, the composition of the present invention may further include carboxylic acid, anti-rust agents, hydrophobic agents, fragrances, and dyes. The carboxylic acid functions as a stabilizer, the hydrophobic agents help with initial water rejection from the surface, while the fragrances and dyes are used to make the resulting composition more pleasing to the eye and nose.

The carboxylic acid stabilizes the reactive alkoxy aminofunctional dialkylpolysiloxane in solution, retarding the polymerization of the silanol groups (Si—OH) generated by hydrolysis, and increase the solubility of the molecule by inserting a proton to the amino groups. Examples of suitable carboxylic acids of the composition of the present invention include: formic acid, acetic acid, propionic acid, lactic acid, and glycolic acid. An example of a particularly suitable commercially available acetic acid is available from BP Chemicals, Incorporated, Cleveland, OH.

An example of a particularly suitable hydrophobic agent is Polypropylene Glycol P-1200, available from Ashland Distribution Company, Columbus, Ohio. An example of a particularly suitable commercially available dye is 52 Chromatint Yellow RS Granular, available from Chromatec Incorporated, Canton, Mich.. An example of a particularly suitable commercially available fragrance is Huckelberry-Wild Strawberry, available from Klabin Fragrances Incorporated, Cedar Grove, N.J.

The composition of the present invention may be made using a mixing process. The components of the composition, including the alkoxy aminofunctional dialkylpolysiloxane, the long chain silicone quaternary blend, the nonionic surfactant, water, co-surfactants, cationic surfactants, zwitterionic surfactants, carboxylic acid, fragrances, dyes, and any other suitable chemicals are mixed together to create a final formulation. Subsequently, the solution may be diluted before its application. An example of a non-limiting range of dilution is between approximately 1 part formula and approximately 50 parts water and approximately 1 part formula and approximately 200 parts water.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following test method was used to characterize the compositions produced in the examples:

Clarity

The samples were visually observed for clarity. Compositions that were not clear were rejected.

Stability

A sample of the composition was placed in a closed glass container at approximately 50° C. for a period of at least two weeks. After the two week period, the sample was observed for any changes in appearance and for homogeneity to ensure that the sample did not split into two or more phases.

Another sample of the composition was placed in a closed glass container and placed on a cycling freezer. The temperature of the cycling freezer dropped to approximately −6.7° C. from room temperature at least four times a day. After the two weeks, the sample was observed for appearance and homogeneity.

Water Resistance

Metal coupons were made from the metallic gray, clear-coated hood of a GM truck, measuring approximately 4 inches by 2 inches. A solution of 1 part of the composition to be tested was diluted to 200 parts water and applied to the coupons. The coupons were first washed with a 1:10 ratio of Solid Gold to water in order to ensure that debris was removed from the coupons. The coupons where subsequently washed with a 1:85 solution of Velocity 3692 using a soft cellulose sponge saturated with the solution. Each coupon was rubbed 30 times with the sponge saturated with the Velocity 3692 solution and then rinsed with tap water, followed by distilled water, and then placed on a plastic rack having a 26° inclination to air-dry. Each group of four coupons was foamed with approximately 1.5 grams (each coupon) of the appropriated testing solution. The foam was spread over the surface of the coupon and rinsed with tap water, followed by distilled water. The coupons were left on the plastic rack and allowed to cure for at least 24 hours. The contact angle of a drop of distilled water was then determined for each coupon by a FTA. 200 Contac Angle instrument manufactured by First Ten Angstroms and controlled by FTA Video Version 1.92 software. Each coupon was tested at four different points. The higher the contact angle, the better the water resistance.

A coupon without the film of the composition was washed as described above and was used to determine the base line with the contact angle instrument. The contact angle of a water droplet on the uncoated coupon was determined from the mean value of 16 measurements. The contact angle was found to be approximately 51°∀4°.

Detergent Resistance

Using the coupons described above, each coated coupon was washed with a 1:85 solution of Velocity 3692 using a soft cellulose sponge saturated with the solution. Each coupon was rubbed 30 times with the sponge saturated with the Velocity 3692 solution and then rinsed with tap water, followed by distilled water, and then placed on a plastic rack having a 26° inclination to air-dry. The contact angle of a water droplet was determined after the wash with the Velocity 3692 solution. This process was repeated 3 times. The higher the contact angle, the better the detergent resistance.

Materials Used

Barlox 12: a nonionic surfactant, available from Lonza Group, Limited, Allendale, N.J.

Glucopon 625: a nonionic surfactant, available from Cognis North America Corporation, Cincinnati, Ohio Glacial Acetic Acid: a carboxlic acid, available from BP Chemicals Incorporated, Cleveland, Ohio.

TEGO Polish Additive Q70: a long chain silicone quaternary blend, available from Goldschmidt Chemical Corporation, Hopewell, Va.

Tegopren 6922: a long chain silicone quaternary blend, available from Goldschmidt Chemical Corporation, Hopewell, Va.

Polypropylene Glycol P-1200: a hydrophobic agent, available from Ashland Distribution Company, Columbus, Ohio.

Ethyleneglycol Monobutyl Ether "EME": a co-surfactant, available from Dow Chemical Company, Midland, Mich.

Dow Corning 536 Fluid: an alkoxy aminofunctional dialkylpolysiloxane, available from Dow Corning Corporation, Midland, Mich.

Dow Corning 1248 Fluid: an alkoxy aminofunctional dialkylpolysiloxane, available from Dow Corning Corporation, Midland, Mich.

Dow Corning 5200 Formulation Aid: a liquid alkylmethyl siloxane copolyol, available from Dow Corning Corporation, Midland, Mich.

CARSPRAY 300: a cationic surfactant, available from Goldschmidt Chemical Corporation, Hopewell, Va.

SF-1706: an alkoxy aminofunctional dialkylpolysiloxane, available from GE Silicones, Waterford, N.Y.

D11052 Chromatint Yellow RS Gran: a dye, available from Chromatec Incorporated, Canton, Mich.

Huckelberry-Wild Strawberry: a fragrance, available from Klabin Fragrances incorporated, Cedar Grove, N.J.

Example 1 and Comparative Examples A, B, C, D, and E

Example 1 is a composition of the present invention, with component concentrations (in weight percent) of deionized water, Barolox-12, ethyleneglycol monobutyl ether, polypropylene glycol P-1200, CARSPRAY 300, Tegopren 6922, glacial acetic acid, Dow Corning 536 Fluid, D11052 Chromatint Yellow RS Gran, and Huckelberry-Wild Strawberry as provided in Table 1. Comparative Examples A, B, C, D, and E are comparative compositions, with component concentrations (in weight percent) of deionized water, Barlox-12, Glucopon 625, ethyleneglycol monobutyl ether, Dow Corning 536 Fluid, Dow Corning 5200 Formulation Aid, Dow Corning 1248 Fluid, CARSPRAY 300, Tegopren 6922, TEGO Polish Additive Q70, glacial acetic acid, SF-1706, D11052 Chromatint Yellow RS Gran, and Huckelberry-Wild Strawberry.

Deionized water, Barlox-12, ethyleneglycol monobutyl ether, polypropylene glycol P-1200, CARSPRAY 300, Tegopren 6922, glacial acetic acid, Dow Corning 536 Fluid, D11052 Chromatint Yellow RS Granular, and Huckelberry-Wild Strawberry were first mixed together to create a formula.

Comparative Example A was prepared as in Example 1, except that Glucopon 625 was added to the composition, TEGO Polish Additive Q70 was used in place of Tegopren 6922, and no polypropylene glycol P-1200, CARSPRAY 300, D11052 Chromatint Yellow RS Gran, or Huckelberry-Wild Strawberry were added to the composition. In addition, the concentrations of Barlox 12 and EME were increased such that they were a greater percentage of the total composition. The concentrations of glacial acetic acid, deionized water, and Dow Corning 536 Fluid were decreased such that they were a lesser percentage of the total composition.

Comparative Example B was prepared as in Example 1, except that Glucopon 625 was added to the composition, TEGO Polish Additive Q70 was used in place of Tegopren 6922, and no polypropylene glycol P-1200, CARSPRAY 300, D11052 Chromatint Yellow RS Granular, or Huckelberry-Wild Strawberry were added to the composition. In addition, the concentrations of Barlox 12 and EME were increased such that they were a greater percentage of the total composition. The concentrations of glacial acetic acid, Dow Corning 536 Fluid, and deionized water were decreased such that they were a lesser percentage of the total composition.

Comparative Example C was prepared as in Example 1, except that Glucopon 625 was added to the composition, TEGO Polish Additive Q70 was used in place of Tegopren 6922, SF-1706 was used at a higher concentration in place of Dow Corning 536 Fluid, and no polypropylene glycol P-1200, CARSPRAY 300, D11052 Chromatint Yellow RS Granular, or Huckelberry-Wild Strawberry were added to the composition. In addition, the concentrations of Barlox 12 and EME were increased such that they were a greater percentage of the total composition. The concentrations of glacial acetic acid and deionized water were decreased such that they were a lesser percentage of the total composition.

Comparative Example D was prepared as in Example 1, except that SF-1706 was used in place of Dow Corning 536 Fluid, Dow Corning Formulation 5200 was added to the composition, and no polypropylene glycol P-1200 was added to the composition.

Comparative Example E was prepared as in Example 1, except that Dow Corning 1248 Fluid was added to the composition, SF-1706 was used in place of Dow Corning 536 Fluid, and no polypropylene glycol P-1200 was added to the composition.

Table 1 provides the composition concentrations, clarity, and stability as analyzed pursuant to the method discussed above, for compositions of Example 1, Comparative Example A, Comparative Example B, Comparative Example C, Comparative Example D, and Comparative Example E.

TABLE 1

| Material, wt % | Ex. 1 | Comp. Ex. A | Comp. Ex. B | Comp. Ex. C | Comp. Ex. D | Comp. Ex. E |
|---|---|---|---|---|---|---|
| Barlox 12 | 15.00 | 25.00 | 25.00 | 15.00 | 15.00 | 15.00 |
| Glucopon 625 | 0.00 | 5.00 | 5.00 | 3.00 | 0.00 | 0.00 |
| Glacial Acetic Acid | 1.00 | 0.15 | 0.15 | 0.25 | 1.00 | 1.00 |
| Tegopren 6922 | 3.00 | 0.00 | 0.00 | 4.00 | 3.00 | 3.00 |
| TEGO Polish Additive Q70 | 0.00 | 4.00 | 4.00 | 0.00 | 0.00 | 0.00 |
| Polypropylene Glycol P-1200 | 2.00 | 0.00 | 0.00 | 0.00 | 0.00 | 0.00 |
| EME | 5.00 | 15.00 | 15.00 | 4.00 | 5.00 | 5.00 |
| DI Water | 67.60 | 50.60 | 49.85 | 62.25 | 67.60 | 67.60 |
| SF-1706 | 0.00 | 0.00 | 0.00 | 5.00 | 2.00 | 2.00 |
| CARSPRAY 300 | 3.00 | 0.00 | 0.00 | 4.00 | 3.00 | 3.00 |
| Dow Corning 536 Fluid | 2.00 | 0.25 | 1.00 | 0.00 | 0.00 | 0.00 |
| Dow Corning 1248 Fluid | 0.00 | 0.00 | 0.00 | 0.00 | 0.00 | 2.00 |
| Dow Corning 5200 Formulation Aid | 0.00 | 0.00 | 0.00 | 0.00 | 2.00 | 0.00 |
| D11052 Chromatint Yellow RS Gran | 0.40 | 0.00 | 0.00 | 0.50 | 0.40 | 0.40 |
| Huckelberry-Wild Strawberry | 1.00 | 0.00 | 0.00 | 2.00 | 1.00 | 1.00 |
| Clarity | Good | Good | Good | Solids suspended in solution | Good | Failed |
| Thermal Stability | Good | Good | Good | Product split when heated | Product split below 0° C. | DC 1248 Fluid did not emulsify |

Example 1 and Comparative Examples A-E were first tested for clarity and thermal stability, which are illustrated by the data provided in Table 1. In particular, the compositions of Example 1, Comparative Example A, Comparative Example B, and Comparative Example D were all clear during observation. In addition, the compositions of Example 1, Comparative Example A, and Comparative Example B exhibited thermal stability.

As can be seen in Table 1, the composition of Comparative Example C did not show good clarity or stability. The stability and clarity of the composition were affected by the relatively large amount of alkoxy aminofunctional dialkylpolysiloxane present in the formulation. When Comparative Example C, which comprised 5.0 wt % of alkoxy aminofunctional dialkylpolysiloxane, was observed for clarity, there were solids suspended in the solution. Additionally, the composition was not homogeneous and lacked thermal stability.

As shown in Table 1, although Comparative Example D showed good clarity, the composition did not show good thermal stability. The composition of Comparative Example D was instable and split when exposed to temperatures below 0° C. The instability of Comparative Example D and Comparative Example E was due to the liquid alkylmethyl siloxane copolyol present in the composition.

TABLE 2

| Mean Contact Angle Value of 4 coupons | Ex. 1 | Comp. Ex. A | Comp. Ex. B |
|---|---|---|---|
| Initial value | 72.5 | 71.91 | 77.91 |
| 1 washes | 73.2 | 64.45 | 73.91 |
| 2 washes | 83.6 | 60.02 | 70.65 |
| 3 washes | 79.4 | 63.10 | 73.32 |

After the compositions were tested for clarity and stability, the compositions showing good clarity and stability (Example 1, Comparative Example A, and Comparative Example B) were tested for water and detergent resistance as previously described. As can be seen in Table 2, the water and detergent resistance of the compositions were greatly affected by the amount of alkoxy aminofunctional dialkylpolysiloxane present in the formulation.

Comparative Example A, which comprised only 0.25 wt % alkoxy aminofunctional dialkylpolysiloxane, had a mean contact angle of 71.91E initially, which dropped to 63.10E after three washes. Comparative Example B, which comprised 1.0% alkoxy aminofunctional dialkylpolysiloxane, had a mean contact angle of 77.91E initially, which dropped to 73.32E after three washes. In comparison, Example 1, which comprised 2.0 wt % alkoxy aminofunctional dialkylpolysiloxane had an initial mean contact angle of 72.5E, which increased to 79.4E after three washes. The increase in contact angle may be due to the washing off of any residual surfactant trapped by the aminofunctional dialkylpolysiloxane polymer due to the higher concentration of the alkoxy aminosiloxane used in the formulation. It can be seen that the contact angle increased after and second wash and then begins to decrease, as expected. The high contact angles, even after several washes, indicate the high resistance to water and detergent of the composition of the present invention for extended periods of time. The lower contact angles of Comparative Examples B and C indicate that the film formed on the surface to be protected did not adequately protect the surface after multiple washes.

Although the present invention has been described with reference to preferred embodiments, workers skilled in the art will recognize that changes may be made in form and detail without departing from the spirit and scope of the invention.

The invention claimed is:
1. A car polish composition consisting essentially of:
(a) an alkoxy aminofunctional dialkylpolysiloxane;

(b) a long chain silicone quaternary blend comprising a diquaternary polydimethylsiloxane;
(c) a carboxylic acid;
(d) a surfactant selected from the group consisting of nonionic surfactants, cationic surfactants, zwitterionic surfactants, and mixtures thereof;
(e) a co-surfactant selected from the group consisting of propylene glycol methyl ether, dipropylene glycol methyl ether, tripropylene glycol methyl ether, propylene glycol n-propyl ether, propylene glycol n-butyl ether, diethylene glycol-ethyl ether, diethylene glycol methyl ether, ethylene glycol propyl ether, and triethylene glycol methyl ether, ethylene glycol n-butyl ether and mixtures thereof;
(f) water; and
(g) an optional additional ingredient selected from the group consisting of anti-rust agents, hydrophobic agents, fragrances and dyes, wherein the car polish composition is hydrophobic film forming and detergent resistant.

2. The composition of claim 1, wherein the long chain silicone quaternary blend further comprises a quaternary polydimethylsiloxane.

3. The composition of claim 1, wherein the alkoxy aminofunctional dialkylpolysiloxane constitutes about 0.002% to about 20% by weight of the composition.

4. The composition of claim 1, wherein the long chain silicone quaternary blend constitutes about 0.002% to about 50% by weight of the composition.

5. The composition of claim 1, where the silicone fatty amino quaternary polydimethylsiloxane constitutes about 0.002% to about 20% by weight of the composition.

6. The composition of claim 1, where the carboxylic acid constitutes about 0.01% to about 5% by weight of the composition.

7. The composition of claim 1, wherein the surfactant constitutes about 0.001% to about 20% by weight of the composition.

8. The composition of claim 1, wherein the co-surfactant constitutes about 0.001% to about 20% by weight of the composition.

9. An aqueous composition for coating and protecting a surface, the composition consisting essentially of:
(a) alkoxy aminofunctional dialkylpolysiloxane constituting about 0.002% to about 20% by weight of the composition;
(b) long chain silicone quaternary blend constituting about 0.002% to about 50% by weight of the composition, wherein the long chain silicone quaternary blend comprises a diquaternary polydimethylsiloxane;
(c) carboxylic acid constituting about 0.01% to about 5% by weight of the composition;
(d) surfactant constituting about 0.001% to about 20% by weight of the composition, wherein the surfactant is selected from the group consisting of nonionic surfactants, cationic surfactants, zwitterionic surfactants, and mixtures thereof;
(e) co-surfactant constituting about 0.001% to about 20% by weight of the composition, wherein the cosurfactant is selected from the group consisting of propylene glycol methyl ether, dipropylene glycol methyl ether, tripropylene glycol methyl ether, propylene glycol n-propyl ether, propylene glycol n-butyl ether, diethylene glycol-ethyl ether, diethylene glycol methyl ether, ethylene glycol propyl ether, and triethylene glycol methyl ether, ethylene glycol n-butyl ether and mixtures thereof;
(f) water; and
(g) an optional additional ingredient selected from the group consisting of anti-rust agents, hydrophobic agents, fragrances and dyes, wherein the composition is hydrophobic film forming and detergent resistant.

10. The aqueous composition of claim 9, wherein the long chain silicone quaternary blend further comprises a quaternary polydimethylsiloxane.

11. The aqueous composition of claim 9, wherein the alkoxy aminofunctional dialkylpolysiloxane constitutes about 1% to about 3% by weight of the composition.

12. The composition of claim 9, wherein the surfactant constitutes about 5% to about 17% by weight of the composition.

* * * * *